United States Patent Office 2,799,588
Patented July 16, 1957

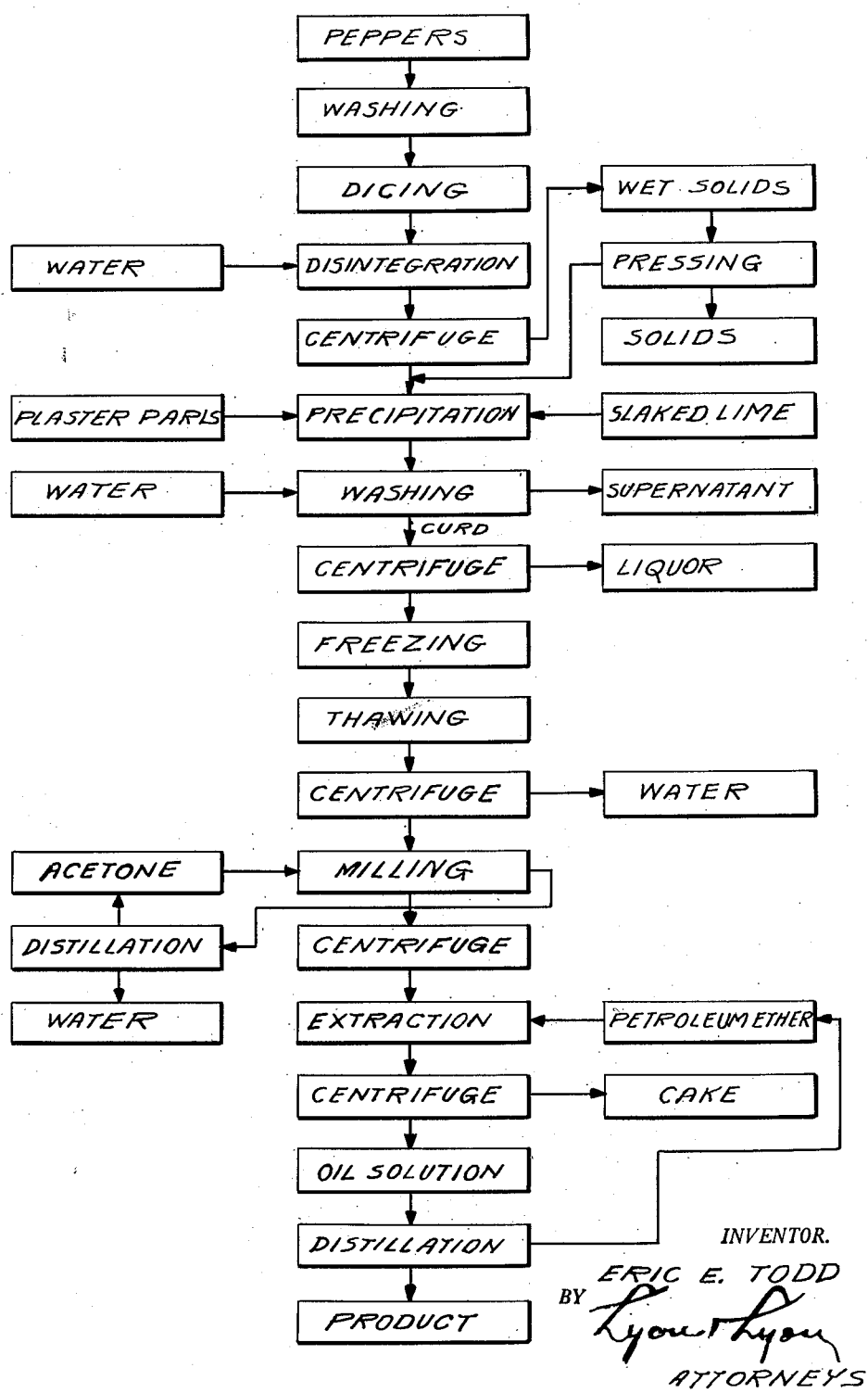

2,799,588

PROCESS FOR THE PRODUCTION OF COLOR BODIES FROM FRESH VEGETABLES

Eric E. Todd, Malibu, Calif.

Application March 28, 1955, Serial No. 496,988

10 Claims. (Cl. 99—148)

This invention relates to the production of oleoresin and has particular reference to the production of oleoresin color from edible vegetables.

One of the principal objects of this invention is to provide a novel process for the production of oleoresin color from vegetables such as fresh peppers, bell peppers, California and Mexican chili, pimiento and paprika, the process also being applicable to recovery of the color bodies in tomatoes, and carotene in carrots.

Conventional oleoresin paprika has generally been produced from a high priced product which must be seeded, stemmed and dry-ground before extraction. The high-sugar content of this dried product greatly hinders the extraction process due to the formation of emulsions. A further object of this invention is to provide a simple and inexpensive process for producing an oleoresin equivalent to paprika but utilizing fresh peppers and other vegetables as the raw material.

It is another object of this invention to provide a process for superior oleoresin color at lower costs and higher yields than has heretofore been possible.

Other objects and advantages of this invention it is believed will be readily apparent from the following detailed description of a preferred embodiment thereof when read in connection with the accompanying drawing.

The single figure of the drawing is a flow sheet illustrating a preferred embodiment of the process of this invention.

In my co-pending application Serial No. 473,099, filed December 6, 1954, on Process for the Production of Oleoresin is described a process wherein the vegetable protein is coagulated by controlled fermentation to form a rubbery mass with the vegetable fiber which entraps the oleoresin, forming an insoluble curd which is separated from the soluble solids such as sugar, acids and the hot capsicum principal. The present invention is an improvement of that process and includes the substitution of a rapid precipitation step for the fermentation step of said process. In the present process the oleoresin color is adsorbed on an insoluble salt, thus increasing the precipitate density and resulting in the rapid settling of a rubber-like curd. This curd may be frozen, thawed, centrifuged and pressed to expel a clear liquid containing only undesirable constituents without loss of color.

The present invention is illustrated by the following specific examples, but it is not intended to limit the invention thereto, the specific steps being shown in the accompanying flow sheet:

*Example 1*

1. 1,000 pounds of fresh, fully ripe California chili peppers were washed in a rotary screen with high pressure sprays to disintegrate rotten areas and thoroughly remove all dirt and foreign matter.

2. The peppers were diced, then pulped in a high-speed disintegrator such as a Rietz with a fine screen to insure a thorough breakdown of the cellular structure.

3. The puree thus produced was washed away from the disintegrator with a stream of water regulated to approximately triple the puree weight.

4. The resulting dilute puree was pumped to a centrifuge and the solids, consisting of waxes and undesirable cellulose, rejected. The solids were further treated in a screw press to increase the juice recovery.

5. The centrifuged and pressed juice was combined and accumulated in a vat, and a slurry of approximately 20 pounds of plaster of Paris (gypsum heated to remove 75% of its water of crystallization) was added to the juice with moderate agitation. Addition plaster of Paris may be used if denser precipitates of less volume are desired. The actual quantity of plaster of Paris varies of course, depending upon the amount of oleoresin present. Generally, from about 5 to about 30 pounds is sufficient. Gypsum itself ($CaSO_4$) may be used, but the plaster of Paris appears to be superior.

6. After the addition of the plaster of Paris the mix was rendered alkaline by the addition of about 12 pounds of slaked lime (calcium hydroxide), the pH being thus adjusted to about 11.0. Usually, from about 4 to about 12 pounds of lime are required. Other alkaline materials, such as ammonia, may be used to adjust the pH. Superior precipitation is accomplished by allowing the oleoresin to adsorb on the plaster of Paris before it is coagulated by the alkaline lime. A heavy rubbery curd appeared, which sank rapidly to the bottom of the vat. The supernatant liquor containing the hot capsicum principal as well as the sugars and chlorophyll in solution were siphoned off as the curd sunk.

7. Water was added to wash the curd, and the slurry was pumped to a centrifuge where the liquor was rejected.

8. The curd was frozen and then thawed.

9. The thawed curd was again centrifuged to produce about 100 pounds of low moisture oleoresin cake. This moist cake contained color units equivalent to about 18 pounds of standard 30,000 units per pound of oleoresin color. The cake is useful as such and may be stored for several days without color loss, or may be frozen for an indefinite period.

10. Further carrying out the process, although not essential, the cake was powdered in a mill and mixed with about two volumes of acetone.

11. The mixture was centrifuged to produce a water-acetone mix from which the acetone was recovered. A small amount of oleoresin was extracted along with the water. Other water-miscible solvents such as ethyl or isopropyl alcohol may be used.

12. The water-free cake was then treated with petroleum ether and centrifuged to give a solution of the desired oleoresin oil.

13. The oleoresin color solution was evaporated in a still from which was removed a concentrated oleoresin solution suitable for use as such or which may be purified by vacuum distillation or other conventional methods.

*Example 2*

The process of this example was the same as that of Example 1, except that it was applied to the production of carotene from 1000 pounds of carrots. In step 9, 10 pounds of cake was obtained. The carrot oil obtained by step 13 was treated with a minimum quantity of petroleum ether to dissolve the oil and leave insoluble carotene crystals, which were filtered off. In this manner, approximately 70% of the carotene was recovered as crystals, leaving the remainder in the carrot oil.

The process of this invention has been applied to pimientos, bell peppers, Mexican chili peppers, California (Anaheim) chili peppers, tomatoes and carrots. The present process is fast and continuous and eliminates the necessity for long precipitation or extraction periods. The plaster of Paris-alkaline precipitation step results in a dense precipitate which is not slimy and hence is readily centrifuged and pressed. The color bodies are strongly held in the presence of water but readily released in the presence of an organic solvent. The freezing step and use of the water miscible solvent provide simple but effective means to remove water without oxidizing the oleoresin color.

Having fully described my invention, it is to be understood that I do not wish to be limited to the details set forth, but my invention is of the full scope of the appended claims.

I claim:

1. A process for the production of color bodies from fresh vegetables selected from the group consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to render the same alkaline and form a curd wherein the color bodies are absorbed on said plaster of Paris, and removing the water and water soluble constituents from said curd.

2. A process for the production of color bodies from fresh vegetables selected from the group consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to render the same alkaline and form a curd wherein the color bodies are absorbed on said plaster of Paris, removing the water and water soluble constituents from said curd, and extracting the color bodies from said curd with a solvent.

3. A process for the production of color bodies from fresh vegetables selected from the goup consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to about 11.0 to form a curd wherein the color bodies are absorbed on said plaster of Paris, and removing the water and water soluble constituents from said curd.

4. A process for the production of color bodies from fresh vegetables selected from the group consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to about 11.0 to form a curd wherein the color bodies are absorbed on said plaster of Paris, removing the water and water soluble constituents from said curd, and extracting the color bodies from said curd with a solvent.

5. A process for the production of color bodies from fresh vegetables selected from the group consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to about 11.0 by the addition of slaked lime to form a curd wherein the color bodies are absorbed on said plaster of Paris, and removing the water and water soluble constituents from said curd.

6. A process for the production of color bodies from fresh vegetables selected from the group consisting of peppers, pimientos, paprika, tomatoes and carrots comprising the steps of disintegrating said vegetables and extracting the juice and pulp therefrom with water to form a puree, separating the juice from said pulp, adding plaster of Paris to said juice, adjusting the pH of the resulting mixture to about 11.0 by the addition of slaked lime to form a curd wherein the color bodies are absorbed on said plaster of Paris, removing the water and water soluble constituents from said curd, and extracting the color bodies from said curd with a solvent.

7. A process for the production of color bodies from fresh vegetables selected from the group consisting of peppers, pimientos, paprika, tomatoes and carrots comprising the steps of disintegrating said vegetables and extracting the juice and pulp therefrom with water to form a puree separating the juice from said pulp, adding plaster of Paris to said juice, adjusting the pH of the resulting mixture by the addition of slaked lime to render the same alkaline and form a curd wherein the color bodies are absorbed on said plaster of Paris, and removing the water and water soluble constituents from said curd.

8. A process for the production of color bodies from fresh vegetables selected from the group consisting of peppers, pimientos, paprika, tomatoes and carrots comprising the steps of disintegrating said vegetables and extracting the juice and pulp therefrom with water to form a puree separating the juice from said pulp, adding plaster of Paris to said juice, adjusting the pH of the resulting mixture by the addition of slaked lime to render the same alkaline and form a curd wherein the color bodies are absorbed on said plaster of Paris, removing the water and water soluble constituents from said curd, and extracting the color bodies from said curd with a solvent.

9. A process for the production of color bodies from fresh vegetables selected from the group consisting of peppers, pimientos, paprika, tomatoes and carrots comprising the steps of disintegrating said vegetables and extracting the juice and pulp therefrom with water to form a puree separating the juice from said pulp, adding plaster of Paris to said juice, adjusting the pH of the resulting mixture to render the same alkaline and form a curd wherein the color bodies are absorbed on said plaster of Paris, freezing and then thawing said curd, and removing supernatant water therefrom.

10. A process for the production of color bodies from fresh vegetables selected from the group consisting of papers, pimientos, paprika, tomatoes and carrots comprising the steps of disintegrating said vegetables and extracting the juice and pulp therefrom with water to form a puree separating the juice from said pulp, adding plaster of Paris to said juice, adjusting the pH of the resulting mixture to render the same alkaline and form a curd wherein the color bodies are absorbed on said plaster of Paris, freezing and then thawing said curd, removing supernatant water therefrom, dehydrating said curd by extraction with a water-miscible solvent and extracting the color bodies from said dehydrated curd with a solvent.

References Cited in the file of this patent

UNITED STATES PATENTS

| | | |
|---|---|---|
| 1,953,607 | Holmes et al. | Apr. 3, 1934 |
| 2,098,110 | Schertz et al. | Nov. 2, 1937 |
| 2,348,443 | Barnett | May 9, 1944 |

FOREIGN PATENTS

| | | |
|---|---|---|
| 700,509 | Great Britain | Dec. 2, 1953 |

OTHER REFERENCES

Serial No. 348,557, Mauri (A. P. C.), published April 20, 1943.